Patented Sept. 26, 1950

2,524,019

UNITED STATES PATENT OFFICE 2,524,019

DECOLORIZATION OF MELAMINE

Johnstone S. Mackay, Old Greenwich, and William P. Lawler, Springdale, Conn., assignors to American Cyanamid Company, New York, N. Y., a corporation of Maine No Drawing. Application November 10, 1947, Serial No. 785,190

5 Claims. (Cl. 183—114.2)

The present invention relates to the treatment of melamine and, more particularly, to decolorizing the same.

In the preparation of melamine by the various high temperature processes in use today, sufficient color develops and contaminates the melamine so that when it is condensed with formaldehyde and the like the resulting resinous syrup is of an amber or dark brown color. Such coloration, of course, is the result of the presence of a very small amount of colored impurity in the melamine, and while it does not interfere with the use of the melamine in other reactions and other applications, it seriously limits the type of plastic materials in which the melamine can be employed. Since the bulk of the melamine produced is used in the preparation of plastic products and most of such plastic products must be of light color or even transparent, it is obvious that the decolorization of melamine is highly important. It has been attempted to prevent the development of color in the first place by the use of various materials in the fabrication of the apparatus employed in the production of the melamine, but so far this line of approach has not been completely successful and the necessity of treating the melamine to decolorize it remains.

An object of the invention is to provide melamine free from color.

Another object of the invention is to provide a method whereby melamine may be decolorized.

A further object of the invention is to provide a process for decolorizing melamine which may be used in conjunction with a process for its production which involves the vaporization of melamine.

A still further object is to provide a process for decolorizing melamine in the vapor state.

These and other objects are accomplished in accordance with the invention to be disclosed more fully hereinafter.

It has now been found that melamine may be decolorized by contacting its vapors with a basic material selected from the group consisting of the alkali metal and alkaline earth metal oxides and hydroxides. Such basic materials include, for example NaOH, $Na_2O$, KOH, $K_2O$, RbOH, $Rb_2O$, $Rb_2O_2$, $Rb_2O_3$, $Rb_2O_4$, LiOH, CsOH, $Cs_2O$, $Cs_2O_2$, $Cs_2O_4$, $Ca(OH)_2$, CaO, $Ba(OH)_2$, BaO, $Mg(OH)_2$, MgO, $Sr(OH)_2$, SrO, and the like.

Such basic materials may be employed individually or as mixtures thereof. They may also be deposited on suitable carriers such as porcelain rings, infusorial earths, and the like. It is preferred to employ those basic materials among those aforementioned which have physical properties more favorably adapted to the conditions of high temperature under which they are used. Since the temperatures required for vaporizing the melamine are at least above 270° C. and preferably above 350° C., it is preferred to employ a basic material which melts at a temperature considerably above these temperatures, because the basic material is more efficiently employed in the solid state. In this connection it will be found that the alkaline earth oxides are more suitable and, accordingly, their use is generally preferred over the use of the alkali metal bases and the alkaline earth hydroxides.

The process of the invention offers particular advantage when used in conjuction with a process for the production of melamine which involves the vaporization of the material. In certain processes for producing melamine, for example, it is advantageous to remove the melamine from the high pressure, high temperature zone in the form of vapor, since this is an easy way of removing the material without decomposition. Also, particular non-volatile impurities which sometimes contaminate the product make it desirable to employ a purification step involving the vaporization of melamine.

In carrying out the process of the invention, the melamine vapors are simply passed over or through the basic material, it being preferable to employ a chamber packed with such material in order to provide for maximum contacting of the melamine vapor and the basic material. While the basic material may be simply packed in pellet or flaked form, preferred packing techniques calling for the use of carriers such as those aforementioned and the interspersal of the basic material in glass wool and the like, should be employed. While the melamine may be vaporized by the simple application of heat, it is advantageous to employ a sweeping gas, preferably ammonia, although other gases such as air, nitrogen, and the like, may also be employed in this connection. The use of such a sweeping gas effectively decreases the temperature required for the vaporization of the melamine so that a temperature as low as 275° C. will be found adequate for this purpose. In some cases, the melamine is necessarily vaporized under high pressures, as, for example, 500 lbs./sq. in., and under such conditions a higher temperature, say 350° C., is required. Advantage is derived from the use of ammonia as a sweeping gas since it serves to stabilize the melamine against decomposition and particularly against deammonation to form melam, melem, and melon.

What is claimed is:

1. A process of removing hydrogen cyanide from melamine comprising contacting vaporized melamine with a basic material selected from the group consisting of the alkali metal and alkaline earth metal oxides and hydroxides, and mixtures thereof.

2. A method of removing hydrogen cyanide from melamine which comprises contacting vaporized melamine with an alkaline earth metal oxide.

3. A method of removing hydrogen cyanide from melamine which comprises contacting vaporized melamine with calcium oxide.

4. A method of removing hydrogen cyanide from melamine which comprises contacting vaporized melamine with barium oxide.

5. A method of removing hydrogen cyanide from melamine which comprises contacting vaporized melamine with magnesium oxide.

JOHNSTONE S. MACKAY.
WILLIAM P. LAWLER.

REFERENCES CITED

The following references are of record in the file of this patent:

UNITED STATES PATENTS

| Number | Name | Date |
| --- | --- | --- |
| 962,840 | Hood | June 28, 1910 |
| 1,463,279 | Arnold | July 31, 1923 |
| 1,511,472 | Hood | Oct. 14, 1924 |
| 1,693,915 | Brode | Dec. 4, 1928 |
| 2,224,061 | Pechukos | Dec. 3, 1940 |
| 2,288,964 | Wedmer | June 7, 1942 |

OTHER REFERENCES

Gregory—Vol. II, 1944; Uses and Applications of Chemicals and Related Materials, page 199.